Sept. 29, 1970            A. K. ALLEN            3,530,735

PRECISION GEAR AND BLANK FOR MANUFACTURE OF THE SAME

Filed Sept. 17, 1968

INVENTOR.
ALTON K. ALLEN

BY *James and Franklin*

ATTORNEYS

United States Patent Office 3,530,735
Patented Sept. 29, 1970

3,530,735
PRECISION GEAR AND BLANK FOR MANUFACTURE OF THE SAME
Alton K. Allen, 11 Flower Lane,
Kingspoint, N.Y. 11024
Filed Sept. 17, 1968, Ser. No. 760,191
Int. Cl. F16h 55/12
U.S. Cl. 74—446          9 Claims

ABSTRACT OF THE DISCLOSURE

A flat stamped metal disc is used for the body of a composite precision gear blank having a plastics rim. The cross section of the plastics rim is uniform entirely around the gear. An undercut peripheral groove is preliminarily machined in the metal body. A plastics rim then is molded by injection molding directly against the periphery of the metal disc, so that an undercut tongue fills the undercut groove to interlock the rim and disc. The groove may have a dovetail section or a T section. Shrinkage of the plastics material inward and outward binds the rim securely to the wheel. Double disc grinding gives the disc parallel face planes. The gear teeth are machine cut, preferably on a stack of such blanks in one operation.

---

Gears made of plastics material have important advantages such as smooth quiet performance, and minimum need for lubrication. For ordinary work, e.g., as in household appliances, the gear may be molded with its teeth, and shrinkage and warping may be tolerated. However, for precision gears or instrument gears great precision is needed, and it is usual to use flat metal discs, and to cut the teeth in a gear cutting machine. Such gears may run from say 1 to 5 inches in diameter, and from 1/16 to 1/4 inch thick, although almost all are in a smaller range from 1/16 to 1/8 inch thickness. The discs may be stacked on a mandrel to form a cylinder and the teeth of all of the discs are cut in the same operation. For such gears a plastic disc is not satisfactory.

For ordinary gearing it has already been proposed to make composite gears, using a metal body combined with a plastics rim and teeth. It is difficult to bond the plastics material to the metal, and one or more annular ridges may be used to prevent axial displacement of the plastics rim. Axially directed ridges are used around the periphery in order to ensure rotation of the rim with the wheel. I have found that such axially directed ridges are not good for precision gears because of changes in cross section of the plastics rim at the axial ridges. A "hop" may develop at changes in cross section, especially with changes of temperature and/or moisture. Moreover, the composite gear does not have the perfectly plane parallel side faces that are needed for precision gear blanks and gears.

I have found it feasible to employ a flat stamped metal disc for the body of a precision gear blank. I employ only a peripheral groove, and no axially directed grooves, so that the cross section of the plastics rim is uniform entirely around the gear. I employ an undercut groove in the metal, this being a machine operation. The plastics rim is molded by injection molding directly against the periphery of the metal disc, so that an undercut tongue fills the undercut groove to interlock the rim and disc. Shrinkage of the plastics material toward the center of the wheel is accompanied by shrinkage in outward direction against the undercut, and this binds the rim securely to the wheel.

The groove may have a dovetail section, or a T section or other undercut section, but this is not for the usual reason of preventing outward movement. Such movement is inherently prevented because of the circular configuration of the rim. The undercut groove is here used primarily to obtain a shrinkage grip of the plastics material against the metal.

The metal used may be stainless steel, but most commonly and preferably is aluminum. This has a relatively high coefficient of thermal expansion, but it is still considerably less than that of the plastics material.

Figure 1:
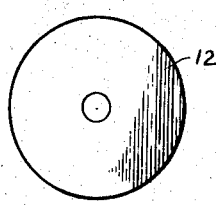
Figure 2:
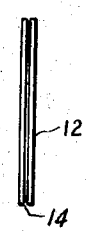
Figure 3:
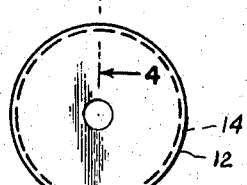
Figure 4:
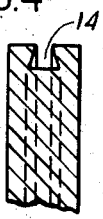
Figure 5:
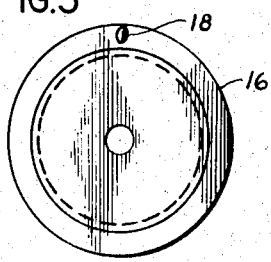
Figure 6:
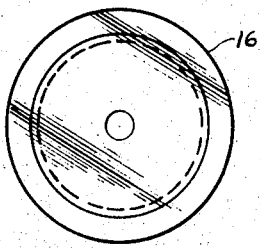
Figure 7:
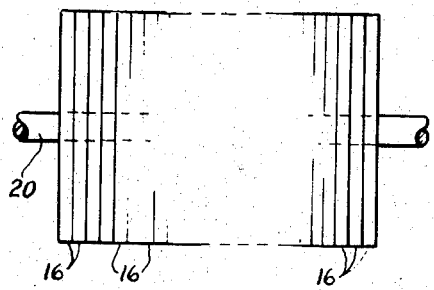
Figure 8:
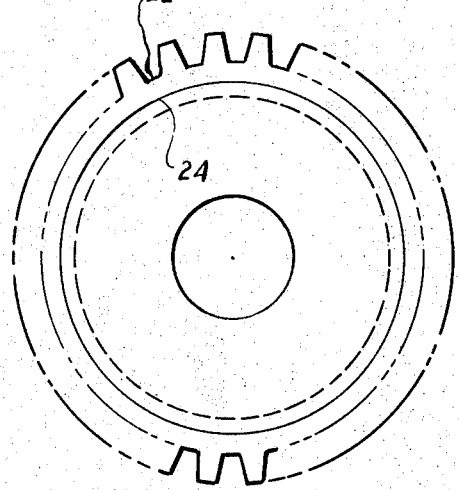
Figure 9:
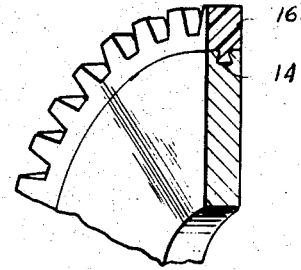
Figure 10:
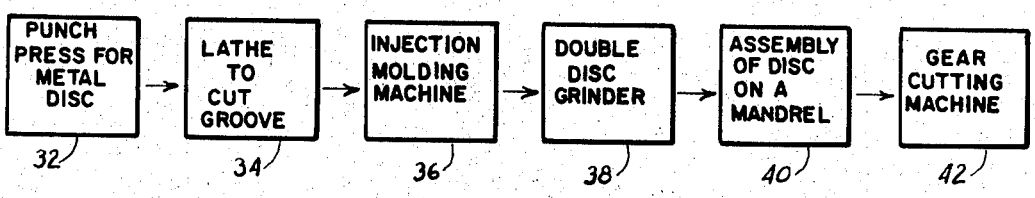
Figure 11:
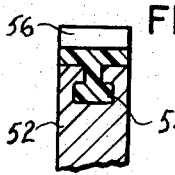

The foregoing and additional features are described in the following detailed specification, which is accompanied by drawings in which:

FIG. 1 shows a stamped metal blank which is to be used in a precision gear;
FIG. 2 is an edge view after machining the peripheral groove;
FIG. 3 is an elevation showing a grooved blank;
FIG. 4 is a fragmentary section drawn to enlarged scale, and taken on the line 4—4 of FIG. 3 to show the undercut groove;
FIG. 5 is an elevation of the gear blank after molding a plastics rim around the metal body;
FIG. 6 is a similar view after double disc grinding to ensure that the side faces of the blank are plane and parallel;
FIG. 7 shows a number of like blanks stacked on a mandrel preparatory to cutting the gear teeth;
FIG. 8 shows a small gear or pinion after cutting of the teeth;
FIG. 9 is a fragmentary perspective view showing a sector of the gear;
FIG. 10 is explanatory of the manufacturing process; and
FIG. 11 is a fragmentary section like FIG. 4, but showing a modified undercut groove.

Referring to the drawing, and more particularly to FIG. 1, a metal blank 12 may be stamped from sheet metal. This is usually aluminum, but when required for special purposes may be made of other metals, for example stainless steel.

The blank of FIG. 1 is next provided with a peripheral undercut groove 14. This is formed by a machining operation, and the groove is an undercut groove, as is better shown in FIG. 4.

The metal blank is then used as a mold insert in a mold cavity which fits tightly against the top and bottom of the disc. The plastics material is injection molded around and directly against the periphery of the disc, so that an undercut tongue is formed in and mates with the undercut groove, thereby interlocking the disc and the rim. In FIG. 5 the plastics rim is shown at 16, and the gate mark or projection is shown at 18. It should be noted that the gating is into the face, rather than into the peripheral edge of the cavity.

The discs are then subjected to double disc grinding, that is, they are disposed between large grinding wheels having parallel faces and rotating in opposite directions. This is done to ensure that the side faces of the disc are plane and parallel, and that the thickness is correct. The grinding operation removes the gate 18 without need for a special operation for that purpose.

The rim may be made of a suitable moldable plastics material. This may be a nylon resin or an acetal resin such as those made by E. I. du Pont de Nemours & Co., Inc. of Wilmington Del., and sold by them under the trademarks "Zytel" and "Delrin" respectively. The rim also may be made of a polyurethane resin.

The discs next are stacked on a mandrel, as is schematically indicated in FIG. 7, in which the discs are centered on a shaft 20. Accessory parts of the mandrel for compressing the discs together may be conventional and are not shown. The cylinder of discs is treated as a unit in an appropriate gear cutting machine. This operates like a milling machine and has a cutter of proper shape to give the teeth the desired contour and spacing.

After the teeth have been cut the discs are separated, and a resulting gear is shown in FIGS. 8 and 9.

The tooth size is exaggerated in FIGS. 8 and 9. In general, these precision gears have rather small teeth, in a range of from 32 to 200 teeth per inch of diameter.

The radial dimension of the plastics rim is small compared to the full radius of the gear. The problems arising from inaccuracy when using plastics material instead of metal, such as warping and thermal expansion, are therefore minimized, because most of the gear is metal. Axial displacement of the plastics rim is effectively prevented by the tongue and groove construction. Relative rotation is prevented because shrinkage of the plastics material is both inward against the outer rim of the metal disc, and outward against the undercut parts of the groove. This increases the grip between the metal body and the plastics part of the gear.

Although the gear blank is mostly metal, the plastics rim must be adequate to provide a safe amount of plastics material between the roots of the teeth shown at 22 in FIG. 8 and the rim 24 of the metal disc. This is preferably about ⅛ inch thick radially for a 2½ inch diameter gear, in order to guard against incipient cracks or breakage of the material as it shrinks. The needed thickness varies from about 1/16 inch radially for a small gear or pinion about one inch in diameter to about 3/16 inch for a gear about four inches in diameter. These dimensions are given for illustration, and are not intended to be in limitation of the invention.

The process of manufacture may be reviewed with reference to FIG. 10 of the drawing. The metal discs are stamped out of appropriate sheet metal in a conventional punch press schematically shown at 32. The periphery of the disc is machined to form the undercut groove, as by means of a lathe or equivalent machine tool, indicated at 34. The discs are put in the mold of an injection molding machine schematically represented at 36, to add the plastics rim. It will be recalled that the gate leads into the side of the rim rather than the outer edge.

The discs are then treated in a double-disc grinder 38, which usually employs oppositely rotating face grinding wheels with an adjustable clear space between the opposed faces of the wheels. That space is adjusted to equal the desired thickness of the gear blank. This treatment incidentally removes any residue of gate on the side of the rim.

A quantity of discs are assembled on a mandrel to form a cylinder of discs, this being indicated at 40, and the assembly is mounted in an appropriate gear cutting machine 42. This mills the gear teeth to appropriate shape and pitch. One manufacturer may perform the operations shown at blocks 32 through 38, and then sell the blanks to another manufacturer who performs steps 40 and 42 to make the gears.

Referring now to FIG. 11, this shows a metal disc 52 with an undercut groove 54, but in this case the undercut groove is T shaped rather than dovetail shaped. It will be understood that the plastics rim is injection molded around and against the metal disc 52 as previously described, thus forming a rim 56 with a T shaped tongue filling the T shaped groove.

In all cases the undercut groove is preferably symmetrical in section, and is preferably located half way between the side faces of the blank, as will be seen from inspection of FIG. 4 and FIG. 11. The blank then may be flipped over or used reversely. It will also be understood that the plastics rim is uniform in section entirely around the blank.

For purpose of interlock, the metal disc might be machined to form an undercut tongue, with the plastics rim then having an undercut groove when molded around the tongue. However, it is found better to provide the groove in the metal disc. If the groove is in the plastics rim there is a loss of strength against shrinkage, unless the radial width of the plastics rim is increased, and that in turn would increase the problems arising from changes in temperature, humidity, etc., which it is here sought to minimize by making most of the body of the gear out of metal.

It is believed that the construction and method of manufacture of my improved precision gears, and the blanks for manufacture of the same, as well as the advantages thereof, will be apparent from the foregoing detailed description. The composite gear combines the rigidity and stability of metal gears, with the good wear, lubricity and quiet of plastics gears.

It will be apparent that while I have shown and described the invention in a preferred form, changes may be made without departing from the scope of the invention, as sought to be defined in the following claims.

I claim:

1. A precision gear blank comprising a circular metal disc having a center hole and having a rim of plastics material secured around the disc, said disc having a continuous circular peripheral groove of undercut cross section about substantially the entire periphery of said disc, said plastics rim being molded around and directly against the periphery of the disc with an undercut tongue received in and mating with the circular undercut groove in order to interlock the disc and the rim, the two sides faces of the blank, including both the metal disc and the plastics rim, being plane and parallel.

2. A precision gear blank as defined in claim 1, in which the metal disc is made of aluminum and has a coefficient of thermal expansion which is relatively high but less than that of the plastics rim.

3. A precision gear blank as defined in claim 1, in which the molded plastics rim is made of a nylon resin.

4. A precision gear blank as defined in claim 1, in which the molded plastics rim is made of an acetal resin.

5. A precision gear blank as defined in claim 1, in which the molded plastics rim is made of a polyurethane resin.

6. A precision gear blank as defined in claim 1, in which the groove in the metal disc has a symmetrical dove-tail section, and is located halfway between the side faces of the blank, and in which the plastics rim has a mating symmetrical section, said section being uniform entirely around the gear.

7. A precision gear blank as defined in claim 1, in which the groove in the metal disc has a symmetrical section, said section being uniform entirely around the T section and is located half way between the side faces of the blank, and in which the plastic rim has a mating symmetrical section, said section being uniform entirely around the gear.

8. A precision gear made of a precision gear blank as defined in claim 1, and having teeth formed in the plastics rim.

9. A percision gear made of a precision gear blank as defined in claim 6, and having teeth formed in the plastics rim.

References Cited

UNITED STATES PATENTS

| | | | |
|---|---|---|---|
| 1,150,131 | 8/1915 | Leitch | 74—446 |
| 1,212,608 | 1/1917 | Calkins | 74—446 |
| 3,013,440 | 12/1961 | White | 29—159.2 |
| 3,200,665 | 8/1965 | Wells | 74—446 |
| 3,237,287 | 3/1966 | Kloski | 29—159.2 |

JOHN F. CAMPBELL, Primary Examiner

VICTOR A. DIPALMA, Assistant Examiner

U.S. Cl. X.R.

29—159.2